US006578137B2

(12) United States Patent
Parady

(10) Patent No.: US 6,578,137 B2
(45) Date of Patent: Jun. 10, 2003

(54) BRANCH AND RETURN ON BLOCKED LOAD OR STORE

(75) Inventor: Bodo K. Parady, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/925,090

(22) Filed: Aug. 8, 2001

(65) Prior Publication Data

US 2001/0047468 A1 Nov. 29, 2001

Related U.S. Application Data

(63) Continuation of application No. 09/340,328, filed on Jun. 28, 1999, now Pat. No. 6,295,600, which is a continuation of application No. 08/675,627, filed on Jul. 1, 1996, now Pat. No. 5,933,627.

(51) Int. Cl.[7] .................................................. G06F 9/40
(52) U.S. Cl. ...................................... 712/228; 712/205
(58) Field of Search ........................... 712/228, 23, 41, 712/205, 43

(56) References Cited

U.S. PATENT DOCUMENTS

| 5,057,997 A | * | 10/1991 | Chang et al. ................ 709/108 |
| 5,361,337 A | * | 11/1994 | Okin .......................... 712/228 |
| 5,515,538 A | * | 5/1996 | Kleiman ....................... 710/260 |
| 5,524,250 A |   | 6/1996 | Chesson et al. ............. 712/228 |
| 5,535,361 A | * | 7/1996 | Hirata et al. ................ 711/145 |
| 5,546,593 A | * | 8/1996 | Kimura et al. .............. 712/228 |
| 5,553,305 A | * | 9/1996 | Gregor et al. .............. 709/106 |
| 5,574,939 A | * | 11/1996 | Keckler et al. ................ 712/24 |
| 5,724,565 A | * | 3/1998 | Dubey et al. ................ 712/245 |
| 5,742,822 A | * | 4/1998 | Motomura ................... 709/102 |
| 5,796,970 A | * | 8/1998 | Higaki et al. ................ 712/200 |
| 5,872,985 A | * | 2/1999 | Kimura ......................... 710/1 |
| 6,253,313 B1 | * | 6/2001 | Morrison et al. ........... 712/226 |

OTHER PUBLICATIONS

Hirata et al., "An elementary Processor Architecture with Simultaneous Instruction Issuing from Multiple Threads," Computer Architecture News, vol. 20, No. 2, May 1992, pp.1136–145.*

Eickemeyer et al., "Evaluation of multithreaded uniprocessors for commercial application environments," pp. 203–212, May 1996.

Kawano et al., "Fine–grain multi–thread processor architecture for massively parallel processing," pp. 308–317, May 1995.

"Register Banking for IBM System/370," IBM Technical Disclosure Bulletin, vol. 34, No. 4B, Sep. 1991, pp. 372–373.

* cited by examiner

Primary Examiner—Eric Coleman
(74) Attorney, Agent, or Firm—Meyertons Hood Kivlin Kowert & Goetzel, P.C.; B. Noël Kivlin; Rory D. Rankin

(57) ABSTRACT

A method and apparatus for switching between threads of a program in response to a long-latency event. In one embodiment, the long-latency events are load or store operations which trigger a thread switch if there is a miss in the level 2 cache. In addition to providing separate groups of registers for multiple threads, a group of program address registers pointing to different threads are provided. A switching mechanism switches between the program address registers in response to the long-latency events.

14 Claims, 6 Drawing Sheets

BRANCH AND RETURN ON BLOCKED LOAD OR STORE

This application is a continuation of U.S. patent application Ser. No. 09/340,328, filed Jun. 28, 1999, now U.S. Pat. No. 6,295,600, entitled "Thread Switch on Blocked Load or Store Using Instruction Thread Field," which is a continuation of U.S. patent application Ser. No. 08/675,627, filed Jul. 1, 1996, now U.S. Pat. No. 5,933,627.

BACKGROUND OF THE INVENTION

The present invention relates to microprocessors which execute multi-threaded programs, and in particular to the handling of blocked (waiting required) memory accesses in such programs.

Many modern computers support "multi-tasking" in which two or more programs are run at the same time. An operating system controls the alternating between the programs, and a switch between the programs or between the operating system and one of the programs is called a "context switch."

Additionally, multi-tasking can be performed in a single program, and is typically referred to as "multi-threading." Multiple actions can be processed concurrently using multi-threading.

Most modern computers include at least a first level and typically a second level cache memory system for storing frequently accessed data and instructions. With the use of multi-threading, multiple programs are sharing the cache memory, and thus the data or instructions for one thread may overwrite those for another, increasing the probability of cache misses.

The cost of a cache miss in the number of wasted processor cycles is increasing. This is due to the processor speed increasing at a higher rate than the memory access speeds over the last several years and into the foreseeable future. Thus, more processors cycles are required for memory accesses, rather than less, as speeds increase. Accordingly, memory accesses are becoming a limited factor on processor execution speed.

In addition to multi-threading or multi-tasking, another factor which increases the frequency of cache misses is the use of object oriented programming languages. These languages allow the programmer to put together a program at a level of abstraction away from the steps of moving data around and performing arithmetic operations, thus limiting the programmer control of maintaining a sequence of instructions or data at the execution level to be in a contiguous area of memory.

One technique for limiting the effect of slow memory accesses is a "non-blocking" load or store (read or write) operation. "Non-blocking" means that other operations can continue in the processor while the memory access is being done. Other load or store operations are "blocking" loads or stores, meaning that processing of other operations is held up while waiting for the results of the memory access (typically a load will block, while a store won't). Even a non-blocking load will typically become blocking at some later point, since there is a limit on how many instructions can be processed without the needed data from the memory access.

Another technique for limiting the effect of slow memory accesses is a thread switch. A discussion of the effect of multi-threading on cache memory systems is set forth in the article "Evaluation of Multi-Threaded Uniprocessors for Commercial Application Environments" by R. Eickemeyer et al. of IBM, May 22–24, 1996, 23rd Annual International Symposium on Computer Architecture. The IBM article shows the beneficial effect of a thread switch in a multi-threaded processor upon a level 2 cache miss. The article points out that the use of separate registers for each thread and instruction dispatch buffers for each thread will affect the efficiency. The article assumes a non-blocking level 2 cache, meaning that the level 2 cache can continue to access for a first thread and it can also process a cache request for a second thread at the same time, if necessary.

The IBM article points out that there exist fine-grain multi-threading processors which interleave different threads on a cycle-by-cycle basis. Coarse-grain multi-threading interleaves the instructions of different threads on some long-latency event(s).

As pointed out in the IBM article, switching in the Tera supercomputer, which switches every cycle, is done in round-robin fashion. The Alewife project is cited as handling thread switching in software using a fast trap.

It would be desirable to have an efficient mechanism for switching between threads upon long-latency events.

SUMMARY OF THE INVENTION

The present invention provides a method and apparatus for switching between threads of a program in response to a long-latency event. In one embodiment, the long-latency events are load or store operations which trigger a thread switch if there is a miss in the level 2 cache. A miss in a level 1 cache, or a hit in a level 2 cache will not trigger a thread switch.

In addition to providing separate groups of registers for multiple threads, a group of program address registers pointing to different threads are provided. A switching mechanism switches between the program address registers in response to the long-latency events.

In one embodiment, the next program address register to be switched to is indicated in a thread field within the long-latency instruction itself. In an alternate embodiment, the program address registers are switched in a round-robin fashion.

Preferably, in addition to the program address registers for each thread and the register files for each thread, instruction buffers are provided for each thread. In a preferred embodiment, there are up to four sets of registers to support four threads.

For a further understanding of the nature and advantages of the invention, reference should be made to the following description taken in conjunction with the accompanying drawings.

DESCRIPTION OF THE PREFERRED EMBODIMENT

Figure 1:
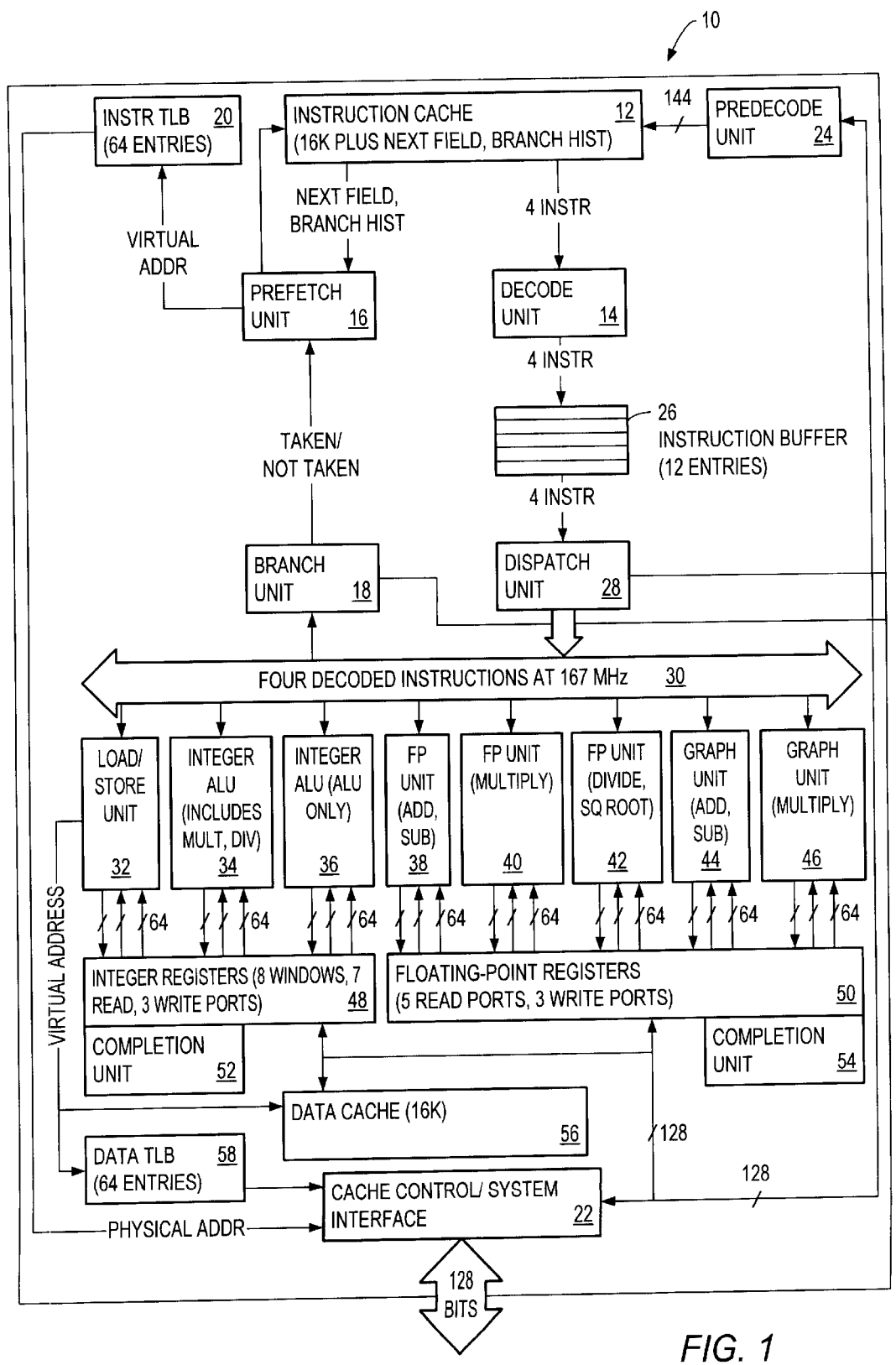
FIG. 1 is a block diagram of a Ultrasparc™ microprocessor which can be modified to incorporate the present invention.

FIG. 1 is a block diagram of an UltraSparc™ microprocessor 10, modified to incorporate the present invention. An instruction cache 12 provides instructions to a decode unit 14. The instruction cache can receive its instructions from a prefetch unit 16, which either receives instructions from branch unit 18 or provides a virtual address to an instruction TLB (translation look-aside buffer) 20, which then causes the instructions to be fetched from an off-chip cache through a cache control/system interface 22. The instructions from the off-chip cache are provided to a pre-decode unit 24 to provide certain information, such as whether it is a branch instruction, to instruction cache 12.

Instructions from decode unit 14 are provided to an instruction buffer 26, where they are accessed by dispatch unit 28. Dispatch unit 28 will provide four decoded instructions at a time along a bus 30, each instruction being provided to one of eight functional units 32–46. The dispatch unit will dispatch four such instructions each cycle, subject to checking for data dependencies and availability of the proper functional unit.

The first three functional units, the load/store unit 32 and the two integer ALU units 34 and 36, share a set of integer registers 48. Floating-point registers 50 are shared by floating point units 38, 40 and 42 and graphical units 44 and 46. Each of the integer and floating point functional unit groups have a corresponding completion unit, 52 and 54, respectively. The microprocessor also includes an on-chip data cache 56 and a data TLB 58.

Figure 2:
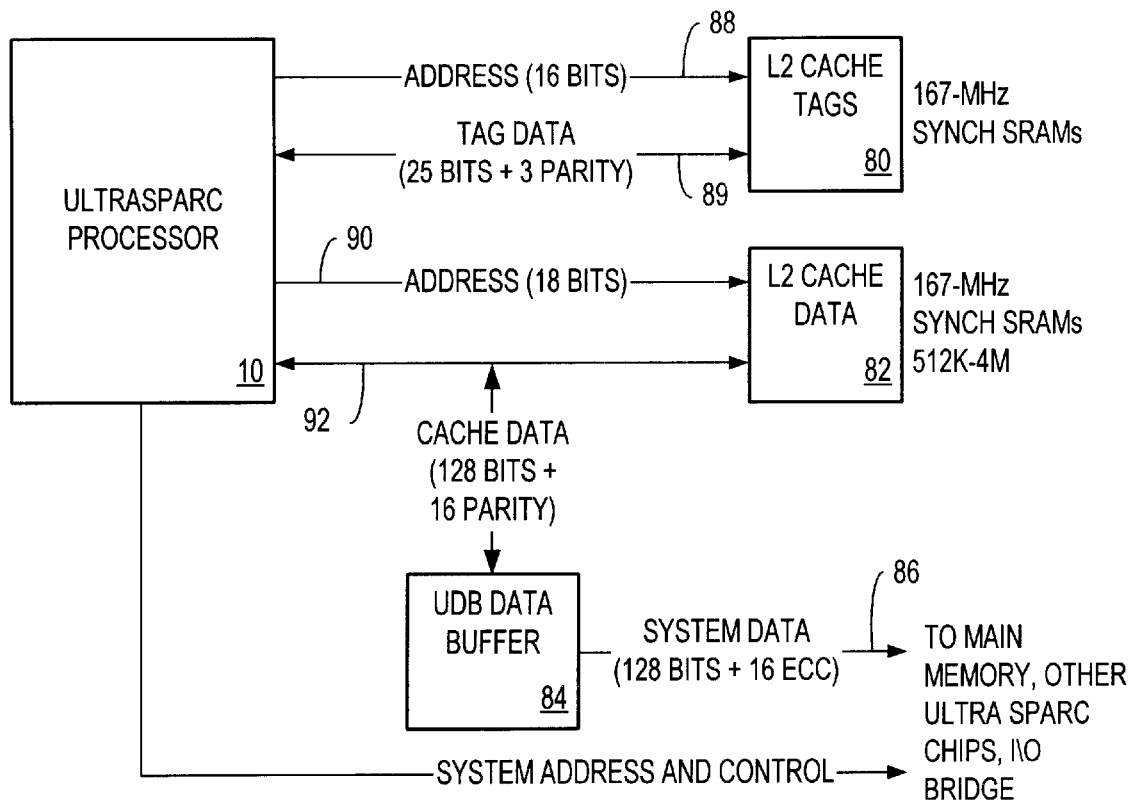
FIG. 2 is a block diagram of a computer system including the processor of FIG. 1.

FIG. 2 is a block diagram of a chipset including processor 10 of FIG. 1. Also shown are L2 cache tags memory 80, and L2 cache data memory 82. In addition, a data buffer 84 for connecting to the system data bus 86 is shown. In the example shown, a 16-bit address bus 88 connects between processor 10 and tag memory 80, with the tag data being provided on a 28-bit tag data bus 89. An 18-bit address bus 90 connects to the data cache 82, with a 144 bit data bus 92 to read or write cache data.

Figure 3:
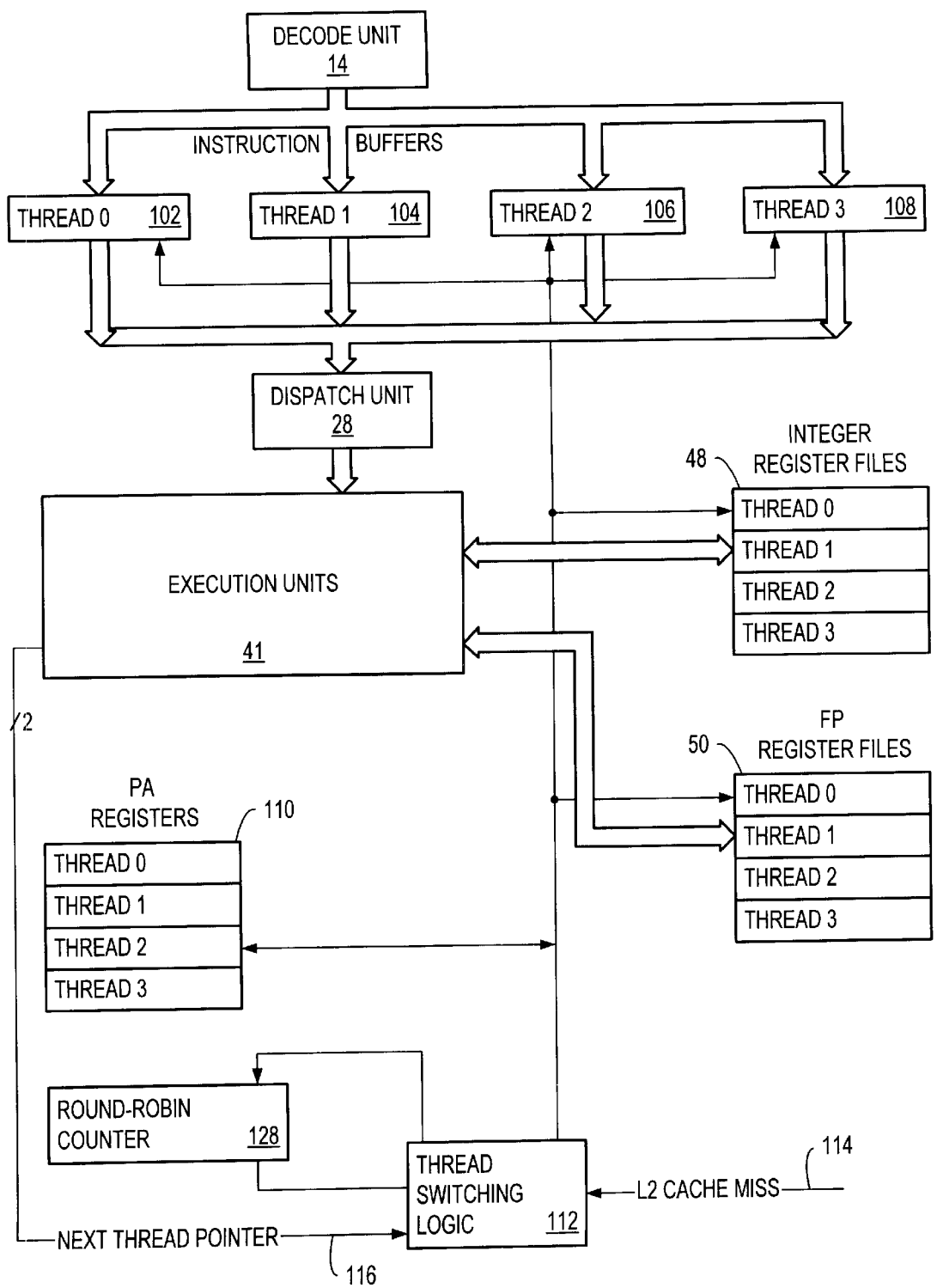
FIG. 3 is a diagram of a portion of the processor of FIG. 1 modified to include a multi-threading capability of the present invention.

FIG. 3 illustrates portions of the processor of FIG. 1 modified to support the present invention. As shown, a decode unit 14 is the same as in FIG. 1. However, four separate instruction buffers 102, 104, 106 and 108 are provided to support four different threads, threads 0–3. The instructions from a particular thread are provided to dispatch unit 28, which then provides them to instruction units 41, which include the multiple pipelines 32–46 shown in FIG. 1.

Integer register file 48 is divided up into four register files to support threads 0–3. Similarly, floating point register file 50 is broken into four register files to support threads 0–3. This can be accomplished either by providing physically separate groups of registers for each thread, or alternately by providing separate register windows for each thread.

The present invention adds four program address registers 110 for threads 0–3. The particular thread address pointed to will provide the starting address for the fetching of instructions to the appropriate one of instruction buffers 102–108. Upon a thread switch, the stream of instructions in one of instruction buffers 102–108 will simply pick up where it left off.

Thread switching logic 112 is provided to give a hardware thread-switching capability. The indication that a thread switch is required is provided on a line 114 providing an L2-miss indication from cache control/system interface 22 of FIG. 1. Upon such an indication, a switch to the next thread will be performed, using, in one embodiment, the next thread pointer on line 116. The next thread pointer is 2 bits indicating the next thread from an instruction which caused the cache miss.

Figure 4:
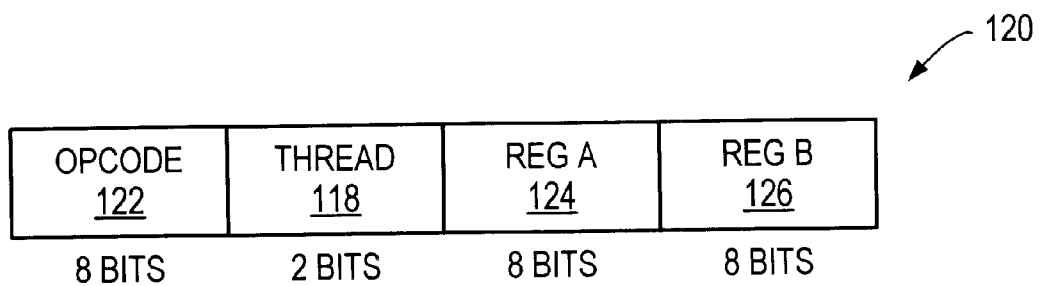
FIG. 4 is a diagram of an instruction including the thread field of the present invention.

Referring to FIG. 4, these two bits of the next thread pointer come from a thread field 118 in an instruction 120. Instruction 120 also includes an OP code field 122 and source and destination register fields 124 and 126, respectively. By adding the 2 bit thread field 118 to appropriate instructions, control can be maintained over thread-switching operations. In one embodiment, the thread field is added to all load and store operations. Alternately, it could be added to other potentially long-latency operations, such as jump instructions.

Referring back to FIG. 3, in an alternate embodiment, the thread switching can be done by simply using a round-robin counter 128 which alternately points to two different ones of PA registers 110.

In alternate embodiments, other numbers of threads could be used, but it has been determined that in most applications, more than four threads do not provide an increase in performance sufficient to justify the additional hardware. In particular, the more threads that are added the greater the chance of a cache miss.

The programmable 2 bits for thread field 118 of FIG. 4 can be used to inter-relate two threads which need to be coordinated. Accordingly, the process could jump back and forth between two threads even though a third thread is available. Alternately, a priority thread could be provided with transitions from other threads always going back to the priority thread. The bits in field 118 would be inserted in an instruction at the time it is compiled in one embodiment. The operating system could control the number of threads that are allowed to be created and exist at one time. In a preferred embodiment, the operating system would limit the number to four threads.

In a preferred embodiment, multi-threading is used only for user programs. Since operating system threads will have a higher proportion of memory access, a lot of load store operations will be required. This, in addition to the fact that there is often a long-latency between operating system functions, increasing the likelihood that operating system data in the caches will have been overwritten, limits the benefits of such multi-threading switches on a blocked memory access in an operating system environment. However, the present invention could be applied to operating system multi-threading as well.

In a preferred embodiment, upon a completion of the memory access which caused the thread switch, the thread with the memory access must wait until it is pointed to again by the round robin or thread pointer bits to continue with its operation. Alternately, a particular thread could be identified as a critical thread, and generate an interrupt as soon as the memory access is completed. The returned data from the load must be provided to the appropriate register for the thread which requested it. This could be done by using separate load buffers for each thread, or by storing a two bit tag in the load buffer indicating the appropriate thread.

In one embodiment, the present invention also supports non-blocking loads which allow the program to continue in the same program thread while the memory access is being completed. Preferably, such non-blocking loads would be supported in addition to blocking loads, which stall the operation of the program thread while the memory access is being completed. Thus, there would not be a thread switch immediately on a non-blocking load, but would be upon becoming a blocking load waiting for data (or store or other long-latency event).

In a preferred embodiment, the instruction set includes the following instructions to support the present invention:

(1) Conditional or unconditional jump to thread (0–3).
(2) Conditional or unconditional jump to thread starting at program address (begins thread).
(3) Jump to next thread.
(4) Stop thread and jump to next thread. Stop if current thread is 00.
(5) Load, go to thread if blocked.
(6) Branch, go to thread if blocked.

Figure 5:
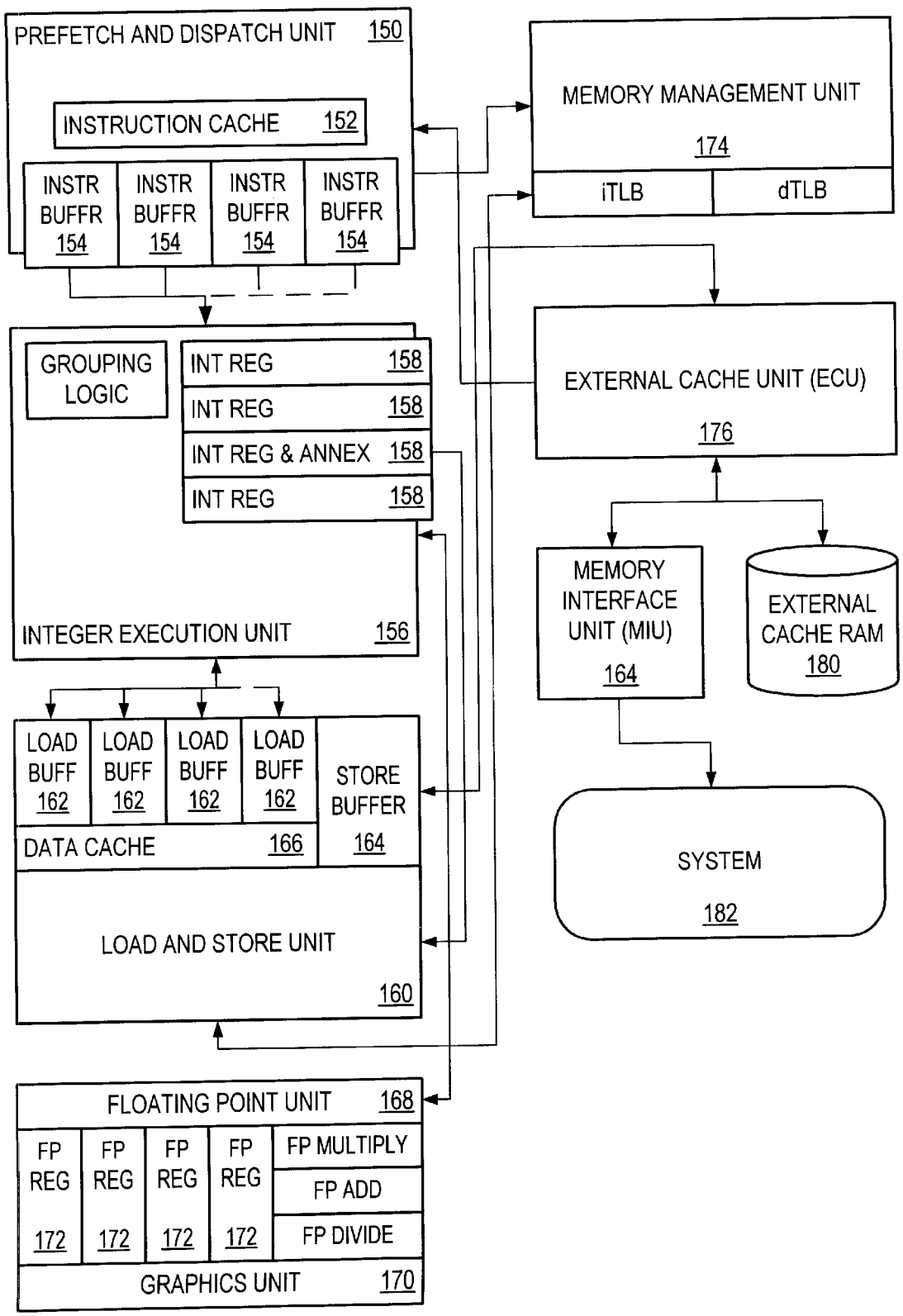
FIG. 5 is a block diagram of a microprocessor incorporating one embodiment of the present invention using multiple register files.

FIG. 5 illustrates a microprocessor according to one embodiment of the present invention using duplicate register files. A prefetch and dispatch unit 150 includes an instruction cache 152 and four instruction buffers 154, one for each of threads 0–3. Integer execution logic 156 includes four sets of integer register files 158. Load and store unit 160 includes four sets of load buffers 162, but only a single store buffer 164 is needed. That is because there may potentially be a switch through all four threads before a load returns, and the load needs to be associated with its originating thread. But a save will be dispatched without worrying about what thread it came from. A single data cache 166 is also provided.

Floating point unit 168 and graphics unit 170 also are connected to four floating point register files 172. The system also has a memory management unit 174, an external cache unit 176, a memory interface unit 178, an external cache 180 and a system bus 182.

Figure 6:
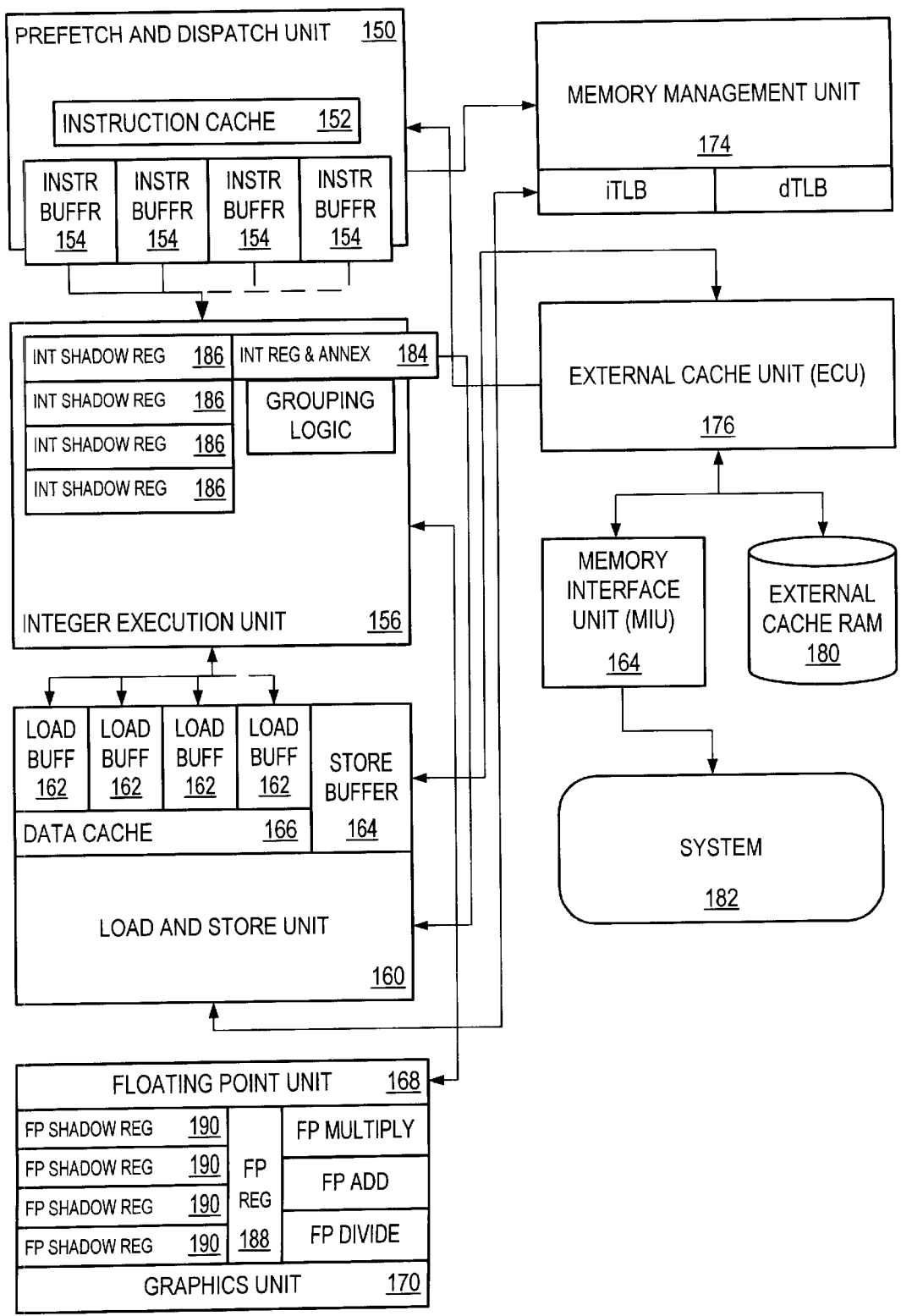
FIG. 6 is a block diagram of an alternate embodiment of a microprocessor using shadow register files.

FIG. 6 is a block diagram of an alternate embodiment of the present invention. FIG. 6 is similar to FIG. 5, except that a main integer register file 184 is used, with four shadow register files 186 for threads 0–3. Also, a main floating point register file 188 is used, along with four shadow floating point register files 190.

Register files often have 5 or more ports, and the ports can take up more silicon than simply duplicating the registers. Thus, it may be more economical to swap the thread data in and out of the four, single or dual-ported shadow register files. This can require two ports to be added to the main register file, if the loading and flushing of register files is not dispatched through existing functional units such as the load/store unit.

Figure 7:
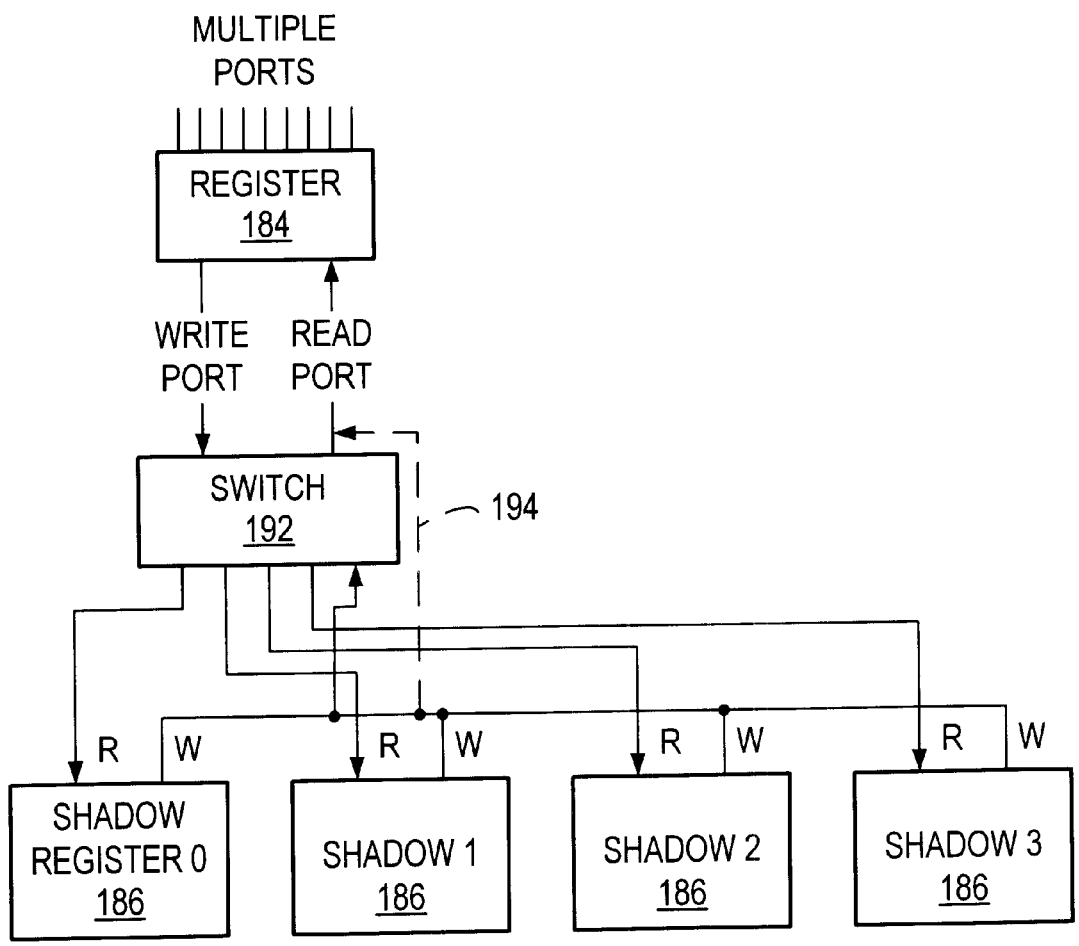
FIG. 7 is a diagram of the register files of the embodiment of FIG. 6.

FIG. 7 is a diagram of one embodiment of the connection of main register file 184 to the shadow register files 186. A data switch 192 can be used to route data to and from the shadow registers. Alternately, a path 194 could be used for a write from the shadow registers to the main register, with only the appropriate shadow register being enabled.

As will be understood by those of skill in the art, the present invention may be embodied in other specific forms without departing from the spirit or essential characteristics thereof. Accordingly, the foregoing embodiments are intended to be illustrative, but not limiting, of the scope of the invention which is set forth in the following claims.

What is claimed is:

1. A microprocessor comprising:
    a plurality of instruction buffers, each of said buffers being configured to store a plurality of program instructions;
    a plurality of program address registers, each said program address register corresponding to one of said instruction buffers, and wherein each of said address registers is configured to store a fetch address;
    an execution unit configured to execute instructions; and
    a thread control unit, wherein said thread control unit is configured to:
        detect a switch signal corresponding to the execution of a first instruction;
        detect the identification of a first register of said plurality of program address registers in a field of said first instruction; and
        switch fetching of instructions from instructions indicated by a second register of said program address registers to instructions indicated by said first register of said program address registers, in response to said signal.

2. The microprocessor of claim 1, wherein in response to said signal, said thread control unit is further configured to switch execution to instructions which are stored in a first buffer of said buffers which corresponds to said first register, from instructions which are stored in a second buffer of said buffers which corresponds to said second register.

3. The microprocessor of claim 2, wherein said signal is indicative of a cache miss.

4. The microprocessor of claim 1, further comprising a plurality of register files, wherein each of said register files corresponds to one of said plurality of buffers and one of said program address registers which also corresponds to said one of said buffers.

5. The microprocessor of claim 4, wherein said plurality of register files comprise shadow register files, and wherein said microprocessor further comprises a main register file, wherein in response to said switch signal said thread control unit is further configured to copy a contents of said main register file to a first shadow register file, and copy a contents of a second shadow register file to said main register file.

6. A method comprising:
    storing a first plurality of instructions in a first instruction buffer and storing a second plurality of instruction is a second instruction buffer;
    storing a first fetch address in a first program address register and storing a second fetch address in a second program address register, wherein said first program address register corresponds to said first instruction buffer and said second program address register corresponds to said second instruction buffer;
    detecting a switch signal corresponding to the execution of a first instruction;
    detecting the identification of said first program address register in a field of said first instruction; and
    switching fetching of instructions from instructions indicated by said second register to instructions indicated by said first register, in response to said signal.

7. The method of claim 6, wherein in response to said signal said method further comprises:
    switching execution from instructions stored in said second buffer to instructions which are stored in said first buffer.

8. The method of claim 7, wherein said signal is indicative of a cache miss.

9. The method of claim 6, further comprising a plurality of register files, wherein each of said register files corresponds to one of said plurality of buffers and one of said program address registers which also corresponds to said one of said buffers.

10. The method of claim 9, wherein said plurality of register files comprise shadow register files, and wherein said method further comprises a main register file, wherein in response to said signal said method further comprises copying a contents of said main register file to a first shadow register file, and copying a contents of a second shadow register file to said main register file.

11. A computer system comprising:
   a cache; and
   a microprocessor coupled to said cache, wherein said microprocessor comprises:
      a plurality of instruction buffers, each of said buffers being configured to store a plurality of program instructions;
      a plurality of program address registers, each said program address register corresponding to one of said instruction buffers, and wherein each of said address registers is configured to store a fetch address;
      an execution unit configured to execute instructions; and
      a thread control unit, wherein said thread control unit is configured to:
         detect a switch signal corresponding to the execution of a first instruction;
         detect the identification of a first register of said plurality of program address registers in a field of said first instruction; and
         switch fetching of instructions from instructions indicated by a second register of said program address registers to instructions indicated by said first register of said program address registers, in response to said signal.

12. The computer system of claim 11, wherein in response to said signal, said thread control unit is further configured to switch execution to instructions which are stored in a first buffer of said buffers which corresponds to said first register, from instructions which are stored in a second buffer of said buffers which corresponds to said second register.

13. The computer system of claim 12, wherein said instructions stored in said instruction buffers are fetched from said cache.

14. The computer system of claim 12, wherein said signal is indicative of a cache miss.

* * * * *